(12) United States Patent
Nguyen et al.

(10) Patent No.: US 11,232,087 B2
(45) Date of Patent: *Jan. 25, 2022

(54) FAST CIRCULAR DATABASE

(71) Applicant: Cisco Technology, Inc., San Jose, CA (US)

(72) Inventors: Khanh Vinh Nguyen, Milpitas, CA (US); Patrick Daniel Wildi, Oakland, CA (US); Naveen Kumar Tyagi, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/908,527

(22) Filed: Jun. 22, 2020

(65) Prior Publication Data

US 2020/0320052 A1    Oct. 8, 2020

Related U.S. Application Data

(63) Continuation of application No. 14/975,287, filed on Dec. 18, 2015, now Pat. No. 10,740,309.

(51) Int. Cl.
*G06F 16/22* (2019.01)
*G06F 16/2458* (2019.01)

(52) U.S. Cl.
CPC ...... *G06F 16/2264* (2019.01); *G06F 16/2255* (2019.01); *G06F 16/2477* (2019.01)

(58) Field of Classification Search
CPC .............. G06F 16/2264; G06F 16/2255; G06F 16/2477
See application file for complete search history.

(56) References Cited

U.S. PATENT DOCUMENTS

| | | | |
|---|---|---|---|
| 5,794,005 A | * | 8/1998 | Steinman ............... G06F 30/20 703/17 |
| 6,003,036 A | | 12/1999 | Martin |
| 6,282,546 B1 | | 8/2001 | Gleichauf et al. |
| 6,415,321 B1 | | 7/2002 | Gleichauf et al. |
| 6,609,085 B1 | | 8/2003 | Uemura et al. |
| 7,472,127 B2 | | 12/2008 | Malloy et al. |

(Continued)

FOREIGN PATENT DOCUMENTS

| | | |
|---|---|---|
| EP | 0996070 | 4/2000 |
| WO | 2015094179 | 6/2015 |

*Primary Examiner* — Eliyah S. Harper
(74) *Attorney, Agent, or Firm* — Polsinelli PC

(57) ABSTRACT

A data management system and associated data management method is disclosed herein. An exemplary method for managing data includes receiving data records timestamped with times spanned by a defined time interval; generating a data cube that includes data planes, wherein each data plane contains a set of data records timestamped with times spanned by the defined time interval; generating an index hypercube for the data cube, wherein dimensions of the index hypercube represent hash values of index keys defined for accessing the data cube; and generating an indexed data cube for storing in a database, wherein the indexed data cube includes the data cube and the index hypercube. The index hypercube includes index hypercube elements, where each index hypercube element represents a unique combination of hashed index key values that map to a data plane in the data cube.

20 Claims, 8 Drawing Sheets

(56) References Cited

U.S. PATENT DOCUMENTS

| | | |
|---|---|---|
| 7,483,889 B2 | 1/2009 | Wang et al. |
| 7,949,186 B2 * | 5/2011 | Grauman ............ G06K 9/6269 |
| | | 382/170 |
| 8,082,239 B2 | 12/2011 | Yang et al. |
| 8,473,450 B2 | 6/2013 | Bakalash et al. |
| 8,682,816 B2 | 3/2014 | Ruhl et al. |
| 8,745,014 B2 * | 6/2014 | Travis ................ G06F 16/2477 |
| | | 707/700 |
| 8,812,487 B2 | 8/2014 | Krishnamurthy et al. |
| 9,432,298 B1 * | 8/2016 | Smith ................ H04L 49/9057 |
| 2003/0126122 A1 * | 7/2003 | Bosley ............... G06F 16/1834 |
| 2004/0260671 A1 | 12/2004 | Potter et al. |
| 2006/0153373 A1 * | 7/2006 | Mukherjee ............ H04H 60/15 |
| | | 380/42 |
| 2008/0222080 A1 | 9/2008 | Stewart et al. |
| 2008/0270363 A1 * | 10/2008 | Hunt ................... G06F 16/2462 |
| 2008/0301256 A1 * | 12/2008 | McWilliams ....... G06F 12/0806 |
| | | 709/214 |
| 2009/0015686 A1 * | 1/2009 | Alsberg ................ G01J 3/2823 |
| | | 348/222.1 |
| 2013/0138646 A1 * | 5/2013 | Sirer ................... G06F 16/2471 |
| | | 707/736 |
| 2013/0242326 A1 * | 9/2013 | Skvirski ............ H04N 1/00204 |
| | | 358/1.13 |
| 2013/0339291 A1 | 12/2013 | Hasner |
| 2014/0095412 A1 | 4/2014 | Agashe et al. |
| 2014/0136563 A1 | 5/2014 | Pompey et al. |
| 2014/0172867 A1 | 6/2014 | Lin et al. |
| 2014/0245279 A1 * | 8/2014 | Ohtake ................... G06F 9/445 |
| | | 717/170 |
| 2015/0052173 A1 | 2/2015 | Leonard et al. |
| 2015/0142733 A1 | 5/2015 | Shadmon |
| 2015/0178631 A1 * | 6/2015 | Thomas ............... G06K 9/6255 |
| | | 706/12 |
| 2015/0186410 A1 | 7/2015 | Petculescu et al. |
| 2015/0186434 A1 | 7/2015 | Eichinger et al. |
| 2015/0234102 A1 * | 8/2015 | Kurzweg ................ G01J 3/32 |
| | | 348/360 |

* cited by examiner

FAST CIRCULAR DATABASE

CROSS-REFERENCE TO RELATED APPLICATION

The instant application is a Continuation of, and claims priority to, U.S. patent application Ser. No. 14/975,287 entitled FAST CIRCULAR DATABASE filed Dec. 18, 2015, the contents of which are herein incorporated by reference in its entirety.

TECHNICAL FIELD

This disclosure relates in general to the field of data management systems and, more particularly, to data management systems for collecting, organizing, storing, and analyzing big data (such as big time-series data).

BACKGROUND

As network environments become increasingly complex, data management systems are collecting, organizing, storing, and analyzing data reaching big data levels (for example, hundreds of terabytes of data). Today's data management systems implement conventional database architectures, such as relational databases and columnar databases, which are not well suited for processing dynamic big data, particularly big time series data. Conventional database architectures, including specialized time series databases, exhibit either limited data query and data analytic flexibility or limited data insertion and data query rates. Accordingly, data management systems are exploring various database architectures for improving data insertion and data query metrics without sacrificing data query capabilities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

A data management system and associated database architecture for optimizing data management are disclosed herein. An exemplary method for managing data includes receiving data records timestamped with times spanned by a defined time interval; generating a data cube that includes data planes, wherein each data plane contains a set of data records timestamped with times spanned by the defined time interval; generating an index hypercube for the data cube, wherein dimensions of the index hypercube represent hash values of index keys defined for accessing the data cube; and generating an indexed data cube for storing in a database, wherein the indexed data cube includes the data cube and the index hypercube. The index hypercube includes index hypercube elements, where each index hypercube element represents a unique combination of hashed index key values that map to a data plane in the data cube. The data plane includes data records having a combination of hashed index key values that matches the combination of hashed index key values represented by the index hypercube element. In some implementations, the method further includes storing the indexed data cube in a circular file of the database based on the defined time interval. In some implementations, the index keys, the dimensions of the index hypercube, or both the index keys and the dimensions are configured based on a most recent query pattern.

Generating the data cube can include receiving a data record timestamped with a time spanned by the defined time interval; generating hashed index key values from index key values associated with the data record; and inserting the data record into a data plane of the data cube based on the hashed index key values for the data record. Generating the indexed data cube can include serializing and compressing the data cube and the index hypercube into a serialized indexed data cube for storing in the database. In some implementations, where the circular database is stored in the database based on time, the method can further include receiving a query for data records in the defined time interval, and using a time index to locate the indexed data cube in the database based on the defined time interval. In some implementations, where the indexed data cube is stored in the database, the method further includes receiving a data query for data records having defined index key values for at least one index key; generating a hash index expression based on the defined index key values for the at least one index key; identifying an index hypercube element that satisfies the hash index expression; and locating a data plane mapped by the identified index hypercube element. The method can further include scanning the data plane to locate data records relevant to the data query.

Example Embodiments

Figure 1:
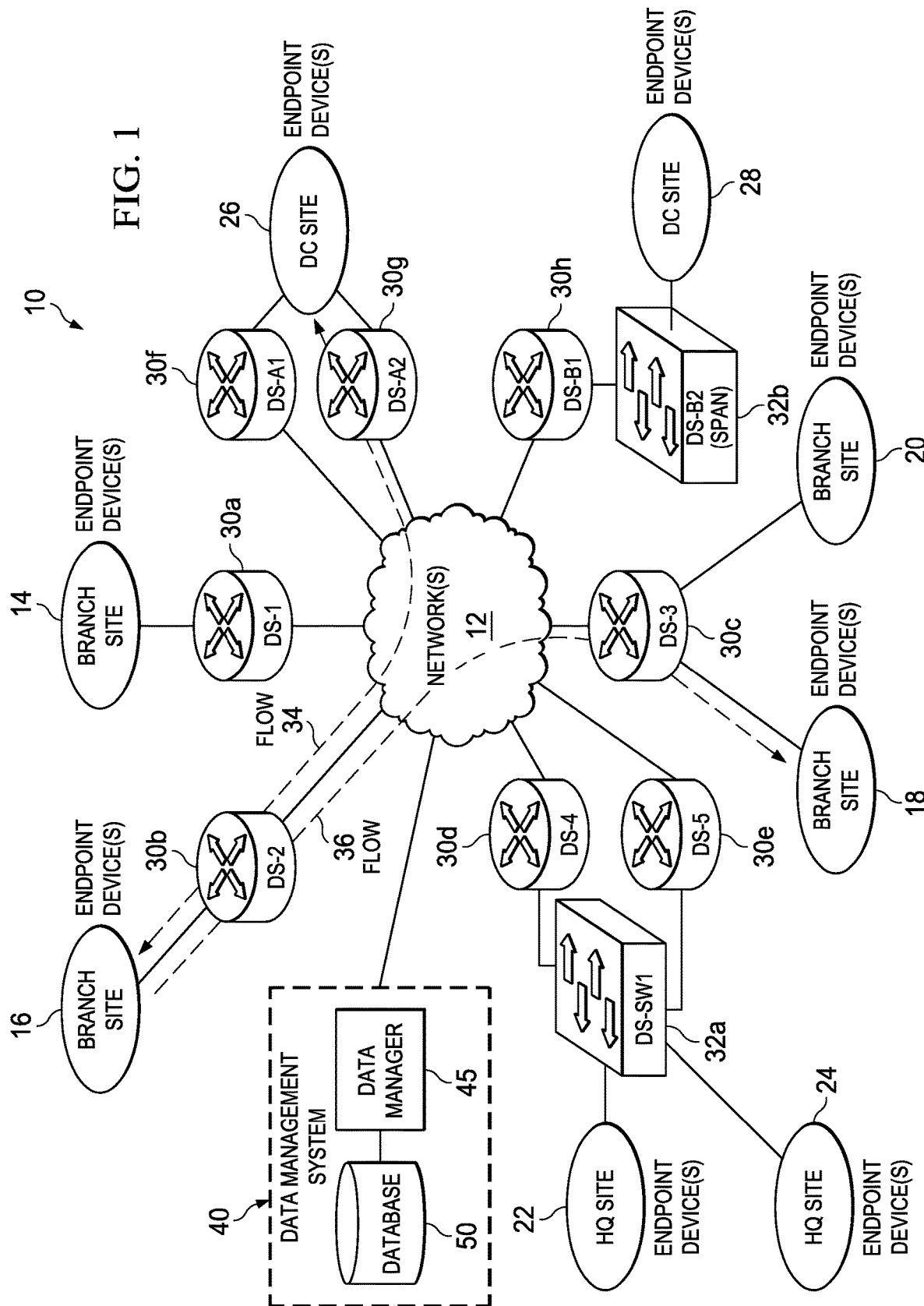
FIG. 1 a simplified schematic block diagram illustrating a communication system for providing network monitoring in a network.

FIG. 1 is a simplified schematic block diagram illustrating a communication system 10 that can implement a data management system as described herein to facilitate network monitoring in a network environment according to various aspects of the present disclosure. Communication system 10 includes a network(s) 12 that interconnects a branch site 14, a branch site 16, a branch site 18, a branch site 20, a headquarters (HQ) site 22, a headquarters (HQ) site 24, a datacenter (DC) site 26, and a datacenter (DC) site 28. Branch site 14, branch site 16, branch site 18, branch site 20, HQ site 22, HQ site 24, DC site 26, and DC site 28 each include a set of endpoint devices (or hosts) from/to which network flows originate/terminate that are grouped together by a common location within communication system 10. For example, a site may include endpoint devices from a same subnet(s), branch router interface(s), and/or virtual local area network(s) associated with their respective sites. In some implementations, a site is associated with a geographic location. For example, a site may include endpoints associated with a branch located in New York. An endpoint device can communicate (for example, by receiving/forwarding packets) with endpoint devices belonging to its associated site and/or with endpoint devices belonging to another site. As used herein, the term "endpoint device" includes any network element, physical or virtual, used to initiate a communication and/or respond to a communication in communication system 10. For example, endpoint devices include any device, component, element, or object capable of initiating voice, audio, video, media, or data exchange in communication system 10. In another example, endpoint devices include any device that initiates a communication on behalf of another network element and/or network entity, such as a program, a database, or any other component, device, element, or object capable of initiating communication in communication system 10. Endpoint devices can be associated with clients, customers, or end users.

Various network nodes and/or network elements connect sites and their associated endpoints to network 12. In FIG. 1, a router 30a, a router 30b, a router 30c, a router 30d, a router 30e, a router 30f, a router 30g, a router 30h, a switch 32a, and a switch 32b connect branch site 14, branch site 16, branch site 18, branch site 20, HQ site 22, HQ site 24, DC site 26, and DC site 28 to network 12. Branch site 14 is in communication with network 12 via router 30a having a data source DS-1 originating therefrom. Branch site 16 is in communication with network 12 via router 30b having a data source DS-2 originating therefrom. Branch site 18 and branch site 20 are each in communication with network 12 via router 30c having a data source DS-3 originating therefrom. HQ site 22 and HQ site 24 are each in communication with network 12 via both router 30d and router 30e via switch 32a. Router 30d has a data source DS-4 originating therefrom, router 30e has a data source DS-5 originating therefrom, and switch 32a has a data source DS-SW1 originating therefrom. DC site 26 is in communication with network 12 via both router 30f (having a data source DS-A1 originating therefrom) and router 30g (having a data source DS-A2 originating therefrom). DC site 28 is in communication with network 12 via router 30h via switch 32b. Router 30h has a data source DS-B1 originating therefrom, and switch 32b has a data source DS-B2 originating therefrom. Exemplary data sources for data source DS-1, data source DS-2, data source DS-3, data source DS-4, data source DS-5, data source DS-A1, data source DS-A2, data source DS-B1, data source DS-B2, data source DS-SW1, and any other data source in communication system 10 include switched port analyzer (SPAN) data sources, NetFlow data export (NDE) data sources, wide area application services (WAAS) data sources, integrated service router (ISR) performance agent (PA) data sources, access control list (ACL) data sources (for example, port ACLs and/or virtual local area network (VLAN) ACLs (VACLs)), and/or any other suitable data source for facilitating network operations in communication system 10.

A network flow refers to a particular communication between at least two endpoint devices in communication system 10. For example, a network flow may be established between a client and a server. In FIG. 1, a network flow 34 is established between an endpoint device at branch site 16 and an endpoint device at DC site 26, and a network flow 36 is established between an endpoint device at branch site 16 and an endpoint device at branch site 18. Network flow 34 passes through router 30b at branch site 16 to router 30g at DC site 26 via network 12, and network flow 36 passes through router 30b at branch site 16 to router 30c at branch site 18 via network 12. Any suitable protocol may be implemented to monitor network flows, such as network flow 34 and network flow 36, in communication system 10. For example, in some implementations, network flows are defined by network flow records using Cisco System Inc.'s NetFlow technology. Using NetFlow technology, a network flow can be defined as a sequence of packets (a data transmission) flowing from a source to a destination in communication system 10. Each network flow has an associated network flow record that conveys network flow information about the network flow. A network flow record can have the following attributes: a source IP address, a destination IP address, a source port, a destination port, an IP protocol, a router interface, a switch interface, a class of service, a number of packets in its associated network flow, a number of bytes in its associated network flow, an earliest time of packets associated with the network flow record, a latest time of packets associated with the network flow record, a duration between the earliest time and the latest time, and/or other attribute. Such network flow information is very useful for monitoring network traffic in communication system 10. For example, the source IP address identifies who is originating the network traffic, the destination IP address identifies who is receiving the network traffic, the source/destination ports characterize an application utilizing the network traffic, the device interfaces characterize how the network traffic is being utilized by a network element, the class of service characterizes a priority of the network traffic, and the number of packets and/or bytes identify an amount of the network traffic. Additional information can be gathered with the network flow, including an IP address of an exporting device (useful for understanding a source of network flow information), network flow timestamps (useful for understanding a network flow's life, along with calculating a number of packets and/or bytes per time period), a next hop IP address, a subnet mask for the source IP address and/or the destination IP address (useful for calculating prefixes), and/or TCP flags (useful for examining TCP handshakes). In some implementations, communication system 10 can define network flows in communication system 10 using Internet Protocol Flow Information Export (IPFIX) provided by an Internet Engineering Task Force (IETF) working group and/or any other suitable protocol for characterizing network flows.

A data management system 40 (also referred to as a network management system) gathers, organizes, stores, and analyzes network flow information in communication system 10. Data management system 40 can analyze network flow information, such as network flow information provided by network flow records, to generate network traffic statistics and/or evaluate network environment(s) associated with communication system 10. For example, for a particular site in communication system 10, data management system 40 can determine a number of bytes sent/received to/from the site, a number of packets sent/received to/from the site, and/or other network traffic metrics associated with the site within a defined time period. In various implementations, data management system 40 can analyze network flow information to determine a top number (N) of applications by transaction time, a top N site-to-site network time, a top N servers by server response time, a top N servers by bits, a top N clients by transaction time, and/or a top N clients by bits. In various implementations, data management system 40 can analyze network flow information to evaluate endpoint activity, such as what endpoint devices (hosts) are consuming a lot of bandwidth and/or what hosts are using specific applications in communication system 10. For example, data management system 40 can identify a top N network flows to/from a particular site (such as branch 16) during a defined time period (such as the last six hours). By analyzing network flow information, data management system 40 can provide network volume and/or network flow information useful for managing network environments associated with communication system 10, including using such information to remedy network deficiencies (such as network traffic bottlenecks).

Data management system 40 includes a data manager 45 and a database 50. Data manager 45 controls and directs operation of data management system 40, such as gathering, organizing, storing, retrieving, and analyzing data (in the present example, network flow information associated with network flow records). Data, as used herein, refers to any type of numeric, voice, video, media, or script data, or any type of source or object code, or any other suitable information in any appropriate format that may be gathered, organized, stored, retrieved, and/or analyzed in communication system 10. In FIG. 1, data manager 45 collects network flow records from various network nodes and/or network elements in communication system 10, such as network flow records exported from router 30a, router 30b, router 30c, router 30d, router 30e, router 30f, router 30g, router 30h, switch 32a, and/or switch 32b. For example, data manager 45 can collect a network flow record associated with network flow 34 from router 30b and router 30g and a network flow record associated with network flow 36 from router 30b and router 30c. Data manager 45 organizes and stores network flow information from the collected network flow records as data records in database 50. In communication system 10, data manager 45 can use time information, such as network flow timestamps, to organize and store data records containing network flow information by time in database 50. In such implementations, data records containing network flow information represent time series data. Time series data generally refers to a sequence of data points over time, where the data points represent successive measurements and/or discrete events over time. Each data record can include a time stamp identifying a time and/or time period associated with network flow information contained in the data record. Database 50 is a collection of organized data (information), which data manager 45 can access by submitting queries to database 50 using any suitable query language, such as structured query language (SQL). Data manager 45 can issue queries to insert new data (data records) into database 50. As described below, database 50 is configured to optimize data insertion and data query performance.

Communication system 10 can include a network topology configured to include any number of servers, virtual machines, switches, routers, and other network elements interconnected to form network 12. Network elements of FIG. 1 may be coupled to one another through one or more interfaces employing any suitable connection (wired or wireless), which provides a viable pathway for electronic communications. Additionally, any one or more of these network elements may be combined or removed from the architecture based on particular configuration needs. As used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information. As used herein, the term "switch" or "router" includes any network element configured to receive packets from a source and forward packets appropriately to a destination in a network. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in communication system 10. Furthermore, the network environment of communication system 10 may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (for example, IEEE 802.11x), ATM, fiber optics, etc. or any suitable combination thereof. In other embodiments, communication links may represent a remote connection through any appropriate medium (for example, digital subscriber lines (DSL), telephone lines, T1 lines, T3 lines, wireless, satellite, fiber optics, cable, Ethernet, etc. or any combination thereof) and/or through any additional networks such as a wide area networks (for example, the Internet).

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Today's data management systems manage massive volumes of time series data. As network environments become increasingly complex, data management systems are collecting, organizing, storing, and analyzing time series data reaching big data levels (for example, hundreds of terabytes of data). In network monitoring applications, a data management system (such as data management system 40) can collect as many as one million network flow records per minute from a single site, and as many as two million network flow records per second from communication system 10, for gathering, organizing, and storing in the data management system's associated database. The data management system then needs to parse data stored in the database to identify data records relevant to various queries. Such massive volumes of data introduce significant complexity to accessing, managing, and updating data. Accordingly, data management systems are exploring various database architectures for optimizing data resource utilization, data insertion metrics, and/or data query metrics. In particular, today's data management systems need a database architecture that facilitates fast, real-time queries for data analytics, such as network performance analytics and/or network performance troubleshooting provided by data management system 40 in network monitoring applications.

Data management systems currently implement various database architectures aimed at improving data insertion and/or data query performance—relational databases, columnar databases, specialized time series databases, and distributed databases—which are all failing to meet processing requirements for time series data reaching big data levels. Relational databases (such as MySQL, Microsoft SQL, PostgreSQL, and Oracle databases, among others), which store time series data by rows, require time-intensive and cost-intensive data inserts and data queries for large volumes of data. For example, relational databases often require numerous disk seeks and input/output (I/O) operations to retrieve time series data, record by record. Though relational databases can implement indexing to reduce disk seeks and/or I/O operations, query performance quickly degrades as the amount of time series data for querying increases. Columnar databases (such as Hewlett Packard's Vertica® and SAP's Sybase® IQ, among others), which store time series data by columns, can facilitate faster queries. However, columnar databases exhibit slower than desirable data insertion rates and often improve query performance for only certain classes of queries. Specialized time series databases (such as Multi Router Traffic Grapher (MRTG) Round Robin Database (RRD) and Open Time Series Database (Open TSDB), among others) have remedied some issues experienced by relational and/or columnar databases, yet still experience other limitations. For example, since MRTG RRD stores time series data contiguously by columns, data management systems can retrieve an entire series of time series data having the same metrics from MRTG RRD with minimal I/O operations, resulting in faster query times over relational and/or columnar databases. However, the time series data must be accessed in specific ways, limiting query flexibility, especially queries involving multiple columns and/or tables. Further, MRTG RRD does not support structured query language (SQL) and can facilitate only simple queries on one metric at a time. Though distributed databases (such as Apache's Hadoop Distributed File System, Google's BigTable, Amazon's DynamoDB, and Facebook's Cassandra, among others) can improve I/O rates and overall query performance compared to other database architectures, such improvements require increased hardware resources and increased data management overhead.

Figure 2:
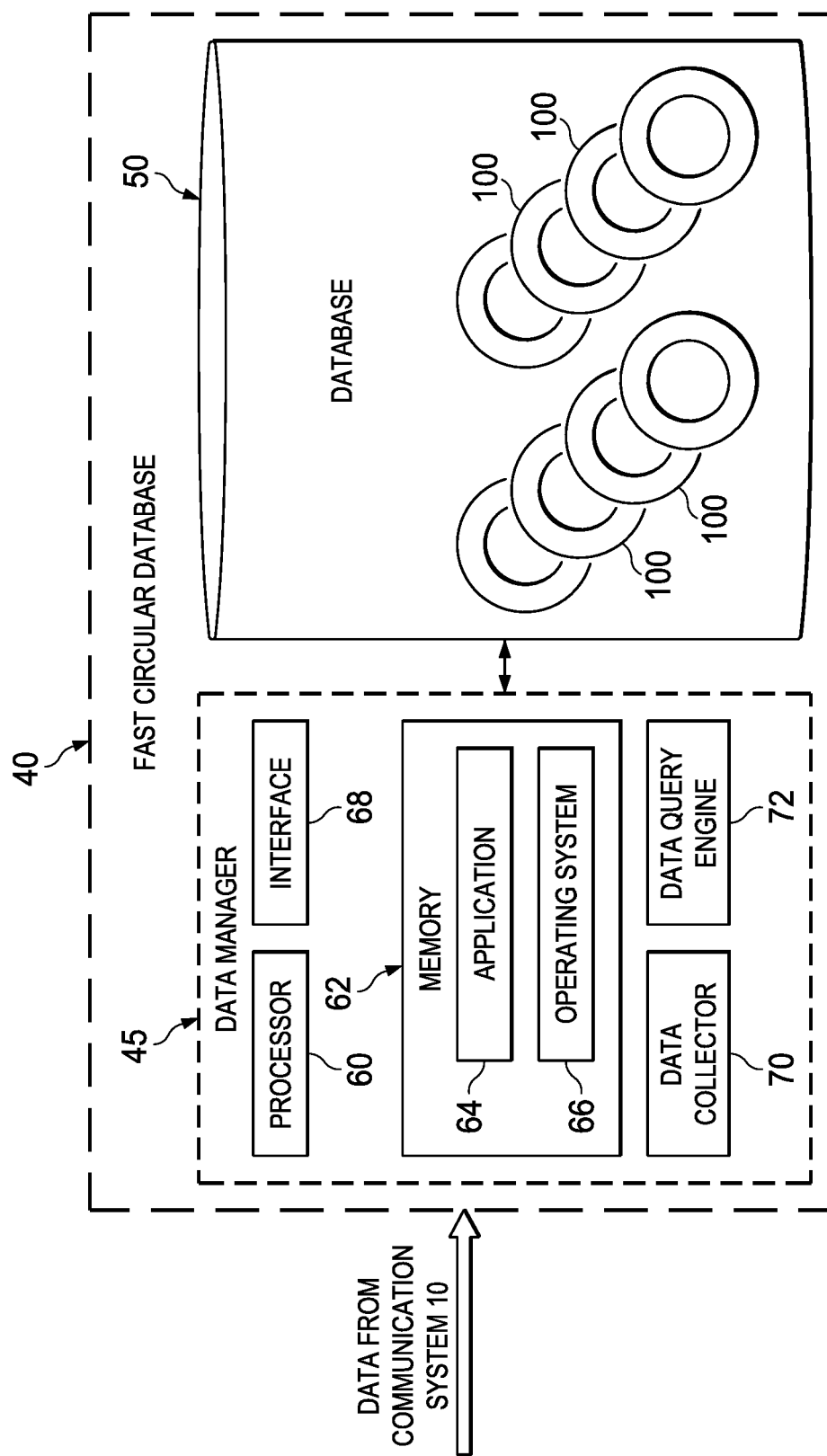
FIG. 2 is a simplified schematic block diagram illustrating a data management system that can be associated with the communication system.

Data management system 40 is designed to address the issues described above (and others) in offering a data management system for collecting, organizing, storing, and analyzing data at big data levels. Turning to FIG. 2, FIG. 2 is a simplified block diagram of a data management system, such as data management system 40, according to various aspects of the present disclosure. Data management system 40, also referred to as a Fast Circular Database (FCDB), is a new database technology for big data (particularly big time series data) that addresses the limitations of conventional database technologies, such as relational databases, columnar databases, specialized time series databases, and distributed databases mentioned above. FCDB achieves very fast query performance for big time series data without sacrificing query flexibility or query analytic capability. Performance tests have shown that FCDB can perform data queries twenty to one thousand times faster than conventional databases. For example, for a same data query, FCDB has been observed to generate a query response in less than seven seconds (and often less than half a second), while conventional databases generated the same query response in more than three minutes. Such significant improvements realized by FCDB will enable data management systems (including network management systems) to scale higher to handle today's increasingly complex and expanding network environments (and accordingly increasingly complex and larger data). Different embodiments may have different advantages than described herein, and no particular advantage is necessarily required of any of the embodiments described herein.

In FIG. 2, data manager 45 includes a processor 60, a memory 62 (including an application(s) 64 and an operating system 66), and interface(s) 68 interconnected by a bus (not shown). Processor 60 is configured to execute any type of instructions associated with data to achieve operations that facilitate data management system 40 performing various data management functions, including the data management functions described herein. Memory 62 is configured to store instruction and/or data associated with operations of processor 60. Operating system 66, portions of which may be resident in memory 62 and executed by processor 60, functionally organize data management system 40. Interface(s) 68 includes network interfaces and/or I/O interfaces. Network interfaces enable communication between data manager 45 and other network elements in communication system 10. Network interfaces can include mechanical, electrical, and signaling circuitry for communicating data over wired links and/or wireless links in communication system 10. Network interfaces may be configured to transmit and/or receive data using a variety of different communication protocols over the wired and/or wireless links. Network interfaces may also be used to implement virtual network interfaces, such as for VPN access or VLANs. I/O interfaces enable communication between data manger 45 and I/O devices. I/O interfaces can include mechanical, electrical, and signaling circuitry for communicating data between one or more I/O devices, such as a keyboard, a display, a mouse, speakers, and/or other I/O device. I/O interfaces may receive input from an external source, such as a user (for example, via a user interface), and may communicate an output to the external source (for example, by display, sounds, or other mechanism).

Data manager 45 further includes a data collector 70 and a data query engine 72 (which can be interconnected to one another by the bus, along with to processor 60, memory 62, application(s) 64, operating system 66, and/or interface(s) 68). Data collector 70 is configured to gather, organize, and store data from communication system 10 in database 50. In FIG. 1 and FIG. 2, data collector 70 gathers network flow records from router 30a, router 30b, router 30c, router 30d, router 30e, router 30f, router 30g, router 30h, switch 32a, and/or switch 32b; and data collector 70 organizes network flow information associated with network flow records into data records for storing in database 50. In various implementations, data collector 70 can tag each network flow record with information, such as a site identifier (ID) indicating a site associated with the network flow's source device, a site ID indicating a site associated with the network flow's destination device, a data source ID indicating a data source associated with the network flow record's exporting device, and/or other information. Data query engine 72 is configured to receive queries (for example, SQL queries) and perform operations on data stored in database 50 based on the queries. For example, data query engine 72 locates data records stored in database 50 that are relevant to a query received from a user via an I/O interface (interface(s) 68) and/or an endpoint device in communication system 10 via a network interface (interface(s) 68). Data query engine 72 also modifies (updates) data records (for example, by inserting data) stored in database 50. In various implementations, data query engine 72 may be referred to as a time series search engine, which performs queries limited by a time range (such as between one time and another, or data earlier than a given time, or the like) on data stored in database 50 and/or generates results ordered by time and/or timestamps (such as from earliest-to-latest or vice versa) based on data requested in the queries. Although FIG. 2 depicts data manager 45 as including data collector 70 and data query engine 72, the present disclosure contemplates implementations where data collector 70 and data query engine 72 are separate from data manager 45 and/or data management system 40. In some implementations, data collector 70 and/or data query engine 72 may be distributed in communication system 10. In some implementations, data manager 45 can collect data from more than one data collector distributed in communication system 10.

Figure 3:
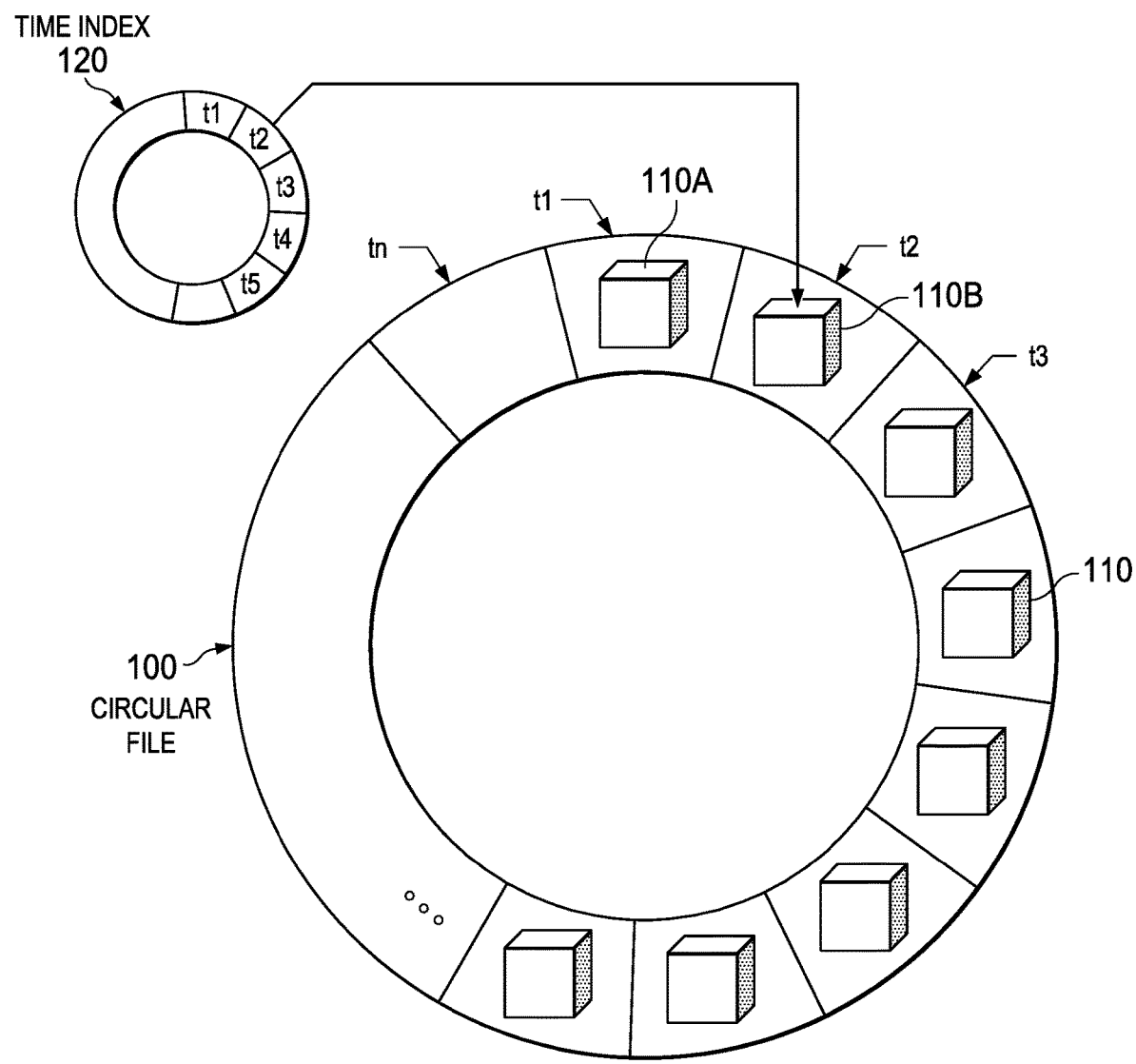
FIG. 3 is a simplified schematic block diagram illustrating a circular file for storing data that can be associated with the data management system.

As noted above, data management system 40 implements FCDB technology. For example, in FIG. 2, database 50 is configured as a fast circular database that includes any number of circular files 100 for storing data. Fast circular database supports fast and flexible data queries without compromising data insertion performance, as described below. Turning to FIG. 3, FIG. 3 is a simplified diagram illustrating an exemplary configuration of a circular file, such as circular file 100, according to various aspects of the present disclosure. Circular file 100 represents a time window, where circular file 100 includes a defined number of time intervals t1, t2, t3 . . . tn spanning periods of time within the time window. Each time interval t1, t2, t3 . . . tn can span a same time period or different time periods. In some implementations, circular file 100 represents a time window spanning one hour, where each time interval t1, t2, t3 . . . t60 spans one minute. For example, circular file 100 can include sixty time intervals (n=60), where each time interval t1, t2, t3 . . . t60 spans sixty seconds. Data is stored within time intervals t1, t2, t3 . . . t60 (also referred to as time buckets). For example, data manager 45 organizes indexed data cubes 110 in time intervals t1, t2, t3 . . . t60 as a circular list, where each indexed data cube 110 stored in circular file 100 includes data records timestamped with a time spanned by the time window represented by circular file 100. In FIG. 3, circular file 100 holds (stores) one indexed data cube 110 per time interval t1, t2, t3 . . . tn—an indexed data cube 110A in time interval t1, an indexed data cube 110B in time interval t2, and so on for time intervals t3 . . . tn. Data manager 45 can assign indexed data cubes 110 to particular time intervals based on times spanned by their timestamped data records. For example, indexed data cube 110A includes data records timestamped with times spanned by time interval t1, indexed data cube 110B includes data records timestamped with times spanned by time interval t2, and so on for time intervals t3 . . . tn. Accordingly, data management system 40 can access data records sequentially, based on time, in circular file 100. In some implementations, database 50 includes multiple circular files that represent a given time window. In such implementations, each circular file can store a same or different type of data within the given time window.

Circular file 100 functions as first in, first out storage, where new data overwrites oldest data stored therein. For example, as circular file 100 reaches capacity and/or updates its associated time intervals, older indexed data cubes 110 are removed to make room for newer indexed data cubes 110. In some implementations, data manager 45 can overwrite an indexed data cube stored in an oldest time interval of circular file 100 with an indexed data cube containing new data. In some implementations, each time interval t1, t2, t3 . . . tn has an associated counter that represents a particular time interval, where database management system 40 can increment and reassign (update) the particular time interval as time elapses. For example, data management system 40 can increment the counters to reflect a most recent (or current) time interval for which data is collected. In such implementations, when all time intervals t1, t2, t3 . . . tn include a respective indexed data cube 110 and time tn elapses, data management system 40 can overwrite the respective indexed data cube 110 in time interval t1 (the oldest time interval) with an indexed data cube containing new data and reset the counter associated with time interval t1, such that time interval t1 then represents a most recent time interval and the newly stored indexed data cube includes data records timestamped with times spanned by the most recent time interval.

A time index 120, which can be maintained by data management system 40, maps time intervals to at least one indexed data cube 110 stored in database 50. Data manager 45 can use time index 120 to access data records based on time. Each time interval is mapped to at least one indexed data cube 110 that includes data records timestamped with times spanned by the time interval. For example, when data manager 45 (in some implementations, data query engine 72) receives a query for data associated with time interval t2, data manager 45 can use time index 120 to locate at least one indexed data cube 110 that includes data records timestamped with times spanned by time interval t2. In FIG. 3, time index 120 maps time interval t2 to a location in circular file 100 that includes indexed data cube 110B. Using time index 120, data manager 45 may also identify other locations in database 50 that map to time interval t2, such as other indexed data cubes stored in other circular files 100 having data records timestamped with times spanned by time interval t2. Data manager 45 can then extract indexed data cube 110B from circular file 100, information from indexed data cube 110B, other indexed data cubes 110 from other circular files 100 stored in database 50 mapped to time interval t2, and/or information from the other indexed data cubes 110 from database 50 for responding to the query.

Though time index 120 facilitates quick retrieval of indexed data cubes 110 based on time, each indexed data cube 110 includes a significant amount of data for parsing by data management system 40 to identify relevant data records. For example, after data manager 45 identifies indexed data cube 110B using time index 120, data manager 45 still needs to search the data records in indexed data cube 110B to identify relevant data records for the query. To vastly accelerate access to data records, instead of organizing data records by rows (like relational databases) or columns (like columnar databases), data manager 45 organizes data in multi-dimensional data cubes indexed by index hypercubes, which significantly reduces data lookup and data retrieval times. For example, each indexed data cube 110 includes a data cube and an index hypercube for locating data records in the data cube. The index hypercube improves data lookup performance by allowing fast direct access to data records using any combinations of index keys. Additionally, the data cube improves data retrieval performance by storing similar data records sharing the same combination of index key values in the same data plane, thus reducing I/O seek time in disk storage, such as hard disk drives. In various implementations, each data cube and its corresponding index hypercube are compressed using any suitable compression mechanism (for example, Snappy, ZLIB, LZ4, GZIP, BZIP2, and/or other compression mechanisms for compressing data), minimizing an amount of storage space consumed by indexed data cubes 110 and optimizing transfer of data from indexed data cubes 110 to data manager 45. Using the multidimensional compressed data structures described herein, data management system 40 can quickly access, both randomly and sequentially, data records within circular file 100.

Figure 4:
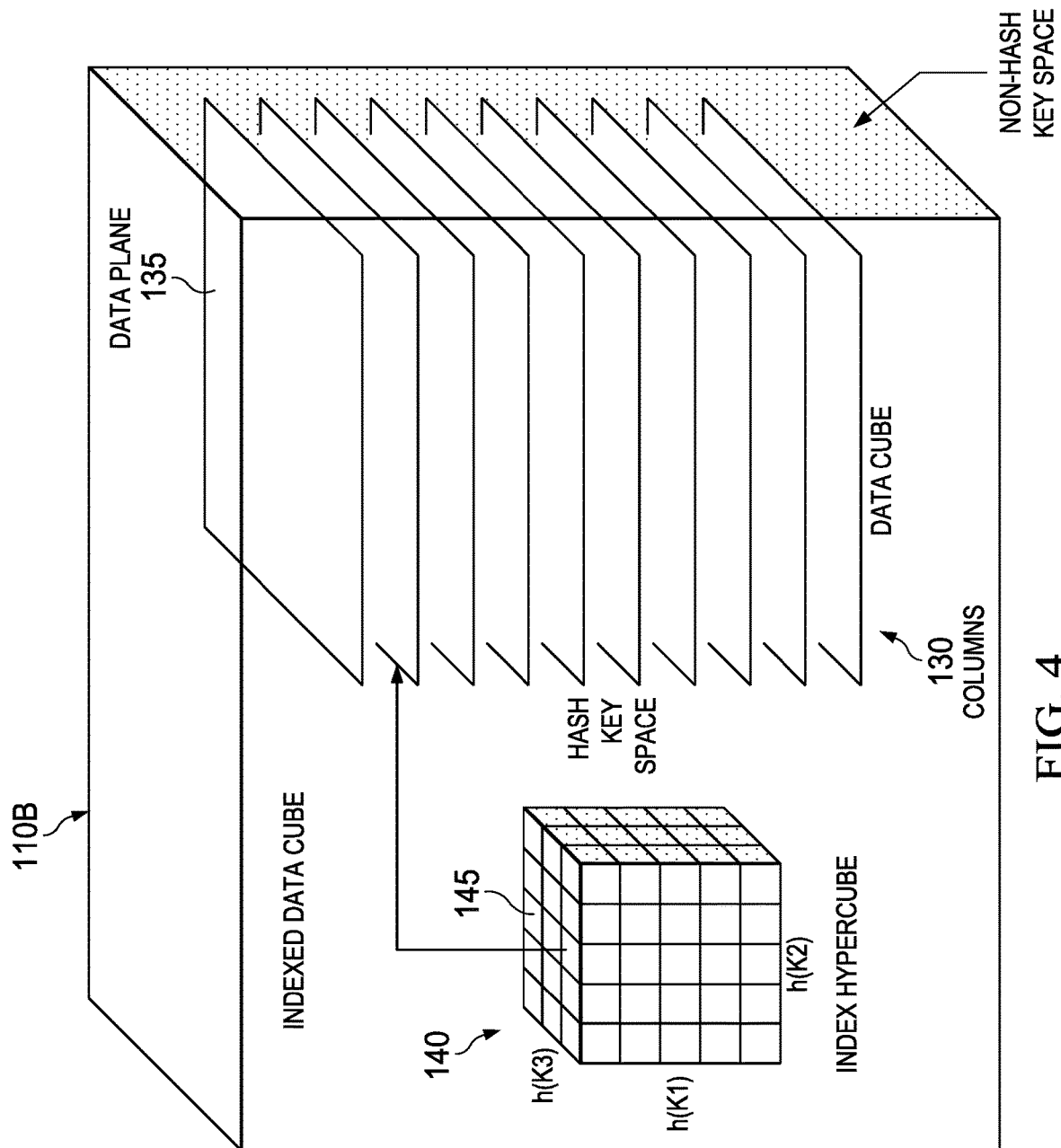
FIG. 4 is a simplified schematic block diagram illustrating a indexed data cube that can be stored in the circular file.

Turning to FIG. 4, FIG. 4 is a simplified diagram illustrating an exemplary configuration of an indexed data cube, such as indexed data cube 110B stored in time interval t2 of circular file 100, according to various aspects of the present disclosure. In FIG. 4, indexed data cube 110B includes a data cube 130 having a set of data planes 135, where each data plane 135 includes data records timestamped with times spanned by time interval t2. Data cube 130 has a hash key space, which is used for selecting data planes 135 to access data records, and a non-hash key space, which is used for scanning data records within the selected data planes 135. Index keys are defined to facilitate access to a subset of data records, such as at least one data plane 135, in data cube 130. "Index key" generally refers to a specified column or set of columns of data planes 135 used to organize (or order) data records in a manner that enhances data access. Data manger 45 (in some implementations, data query engine 72) uses at least one index key to locate at least one data plane 135 in data cube 130 that includes data records relevant to a query. For example, data manager 45 organizes data records within data cube 130 using each data record's associated index key values for one or more index keys, particularly arranging data records in data planes 135 using the hash key space. In various implementations, for a data record, data manager 45 (in some implementations, data collector 70) generates hash values for the data record's index key values and adds the data record into one of data planes 135 based on the data record's hashed index key values. In the present example, data cube 130 is indexed by an index key K1, an index key K2, and an index key K3. For each data record, data manager 45 computes hash values h(V1), h(V2), and h(V3) for the data record's index key values V1, V2, and V3 for index key K1, index key K2, and index key K3, respectively, and adds the data record to data planes 135 based on the hashed key space of data cube 130. Any suitable hashing algorithm may be implemented for the hashing operations described herein.

An index hypercube 140 is stored with data cube 130, where data manager 45 uses index hypercube 140 to access data cube 130. Index hypercube 140 is a multi-dimensional table having any number of dimensions, where each dimension represents hash values of one or more index keys defined for accessing data cube 130. In FIG. 4, index hypercube 140 includes three dimensions—a h(K1) dimension representing all possible hash values of index key K1, a h(K2) dimension representing all possible hash values of index key K2, and a h(K3) dimension representing all possible hash values of index key K3. Index hypercube 140 associates hash values of index keys K1, K2, and K3 to corresponding data planes 135. For example, index hypercube 140 includes index hypercube elements 145, where each index hypercube element 145 represents a unique combination of hashed index key values (here, for index key K1, index key K2, and index key K3). Each index hypercube element 145 points to one of data planes 135 having data records that share the same combination of hashed index key values. Index keys for indexing data cube 130 and/or dimensions for index hypercube 140 are configurable, either manually (for example, by a user accessing data management system 40) or automatically (for example, by data management system 40) based on any useful data management criteria, such as most frequent query patterns. "Index hypercube" generally refers to a data structure that includes index hypercube elements that identify subsets of data records in a data cube (such as particular data planes in a data cube) for any given combination of index key values (in the present example, any given combination of hashed index key values). Since index hypercube elements 145 map to particular sets of data within data cube 130, data management system 40 can locate and access data within indexed data cubes 110B more efficiently using index hypercube 140. For example, instead of scanning all data records in indexed data cube 110B, data manager 45 (in some implementations, data query engine 72) uses index hypercube 140 to identify data planes 135 in data cube 130 that includes data records relevant to a query and parses only identified data planes 135 to locate relevant data records.

Figure 5:
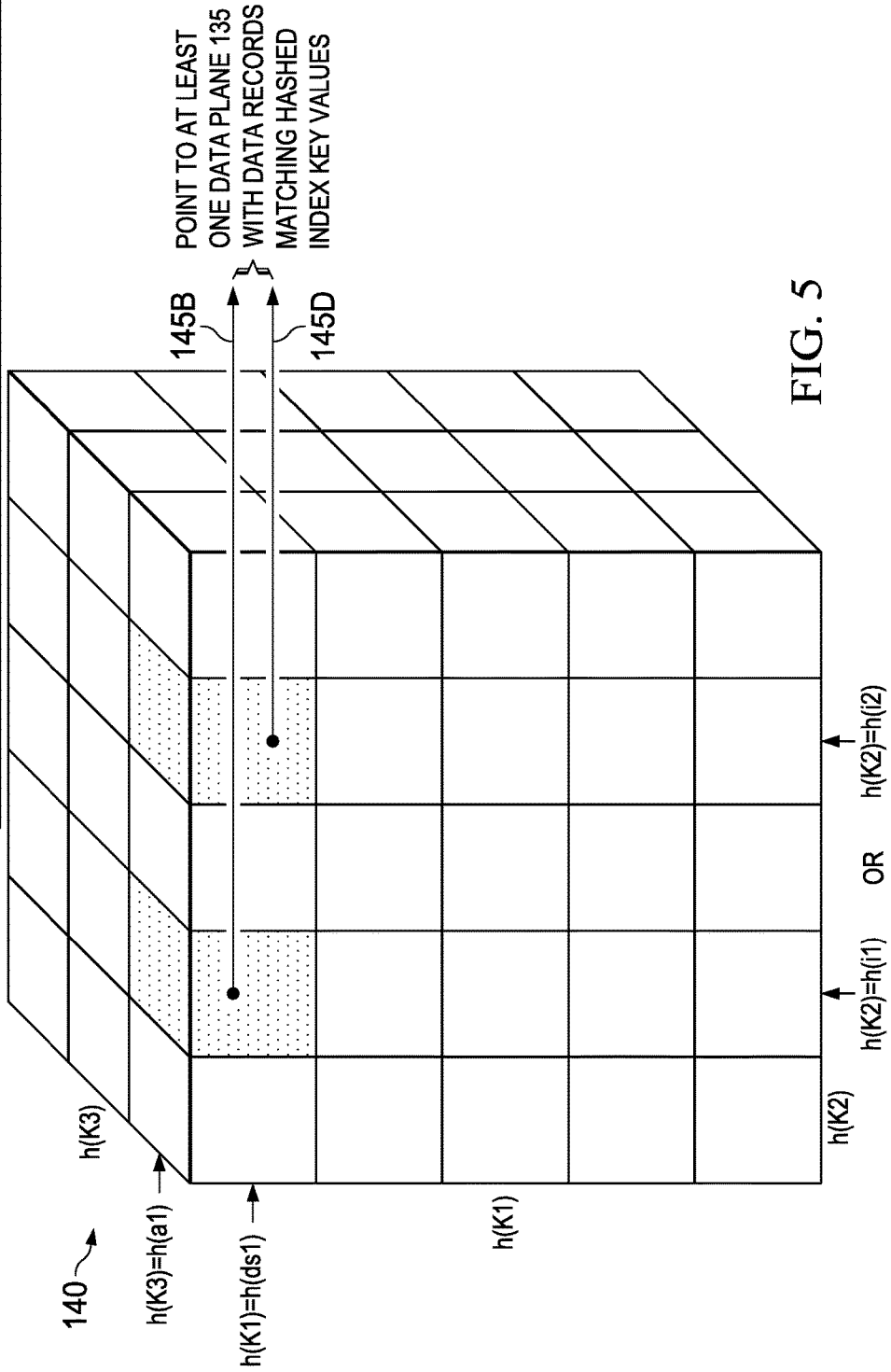
FIG. 5 is a simplified schematic block diagram illustrating an exemplary configuration of an index hypercube that can be associated with a data cube.

In implementations where data management system 40 facilitates network monitoring applications, index key K1 can indicate a data source (DataSrc) from which data management system 40 receives network flow information associated with network traffic (for example, an exporting device, such as a router, that sends network flow records to data management system 40), index key K2 can indicate a device interface (Inf) associated with the network traffic (for example, a router interface and/or switch interface traversed by the network traffic), and index K3 can indicate an application (AppID) utilizing the network traffic. Turning to FIG. 5, FIG. 5 is a simplified diagram illustrating an exemplary configuration of an index hypercube, such as index hypercube 140, according to various aspects of the present disclosure. In FIG. 5, index hypercube 140 includes three dimensions—a h(DataSrc) dimension representing all possible hashed values for data sources in data cube 130, a h(Inf) dimension representing all possible hashed values for interfaces in data cube 130, and a h(AppID) dimension representing all possible hashed values for applications in data cube 130. Each index hypercube element 145 represents a unique combination of hashed values for data source, interface, and application associated with the network traffic. Each index hypercube element 145 thus points to at least one data plane 135 having data records that share the same combination of hashed index key values. Data manager 45 can use index hypercube 140 as depicted in FIG. 5 to locate one or more data planes 135 in data cube 130 in response to network traffic related queries. For example, data manager 45 (in some implementations, data query engine 72) can receive a data query 150 that requests data records from time interval t2 having particular values for the index keys, such as a particular data source, a particular interface, and a particular application. In FIG. 5, data query 150 represents a SQL query having a WHERE clause that requests data records whose data source is "ds1" (DataSrc=ds1), interface is "i1" or "i2" (Inf=i1 or i2), application is "a1" (AppID=a1), and virtual local area network (VLAN) is "v1" (VLAN=v1). From data query 150, data manager 45 generates a hash index expression 160. Data manager 45 can build hash index expression 160 from the WHERE clause associated with data query 150, where hash index value h(ds1) is a hashed value of data source ds1, h(inf1) and h(inf2) are hashed values respectively of interface i1 or interface i2, and h(a1) is a hashed value of application a1. From hash index expression 160, data manager 45 identifies index hypercube elements 145 whose combination of hashed values satisfy hash index expression 160. Data manager 45 then uses identified index hypercube elements 145 to locate the associated data planes in data cube 130. For example, in FIG. 5, two index hypercube elements 145 satisfy hash index expression 160: index hypercube element 145B representing a combination of hashed values for h(ds1), h(i1), and h(a1), and index hypercube element 145D representing a combination of hashed values for h(ds1), h(i2), and h(a1). Index hypercube element 145B maps to a data plane containing data records having a combination of hashed index key values that match the combination of hashed values represented by index hypercube element 145B, and index hypercube element 145D maps to a data plane containing data records having a combination of hashed index key values that match the combination of hashed values represented by index hypercube element 145D. Accordingly, instead of scanning all data records in data cube 130 (in other words, all data records in time interval t2), data manager 45 scans a small subset of data records (here, data records in the two data planes identified by index hypercube element 145B and index hypercube element 145D) to identify relevant data records for data query 150, significantly reducing lookup time. Furthermore, since the data records in each data plane are stored together in circular file 100, I/O seek time is minimized. Data manager 45 (in some implementations, data query engine 72) can then generate a data query response that includes the relevant data records, which data manager 45 can relay to the user, network element, and/or endpoint device that generated the data query.

Figure 6:
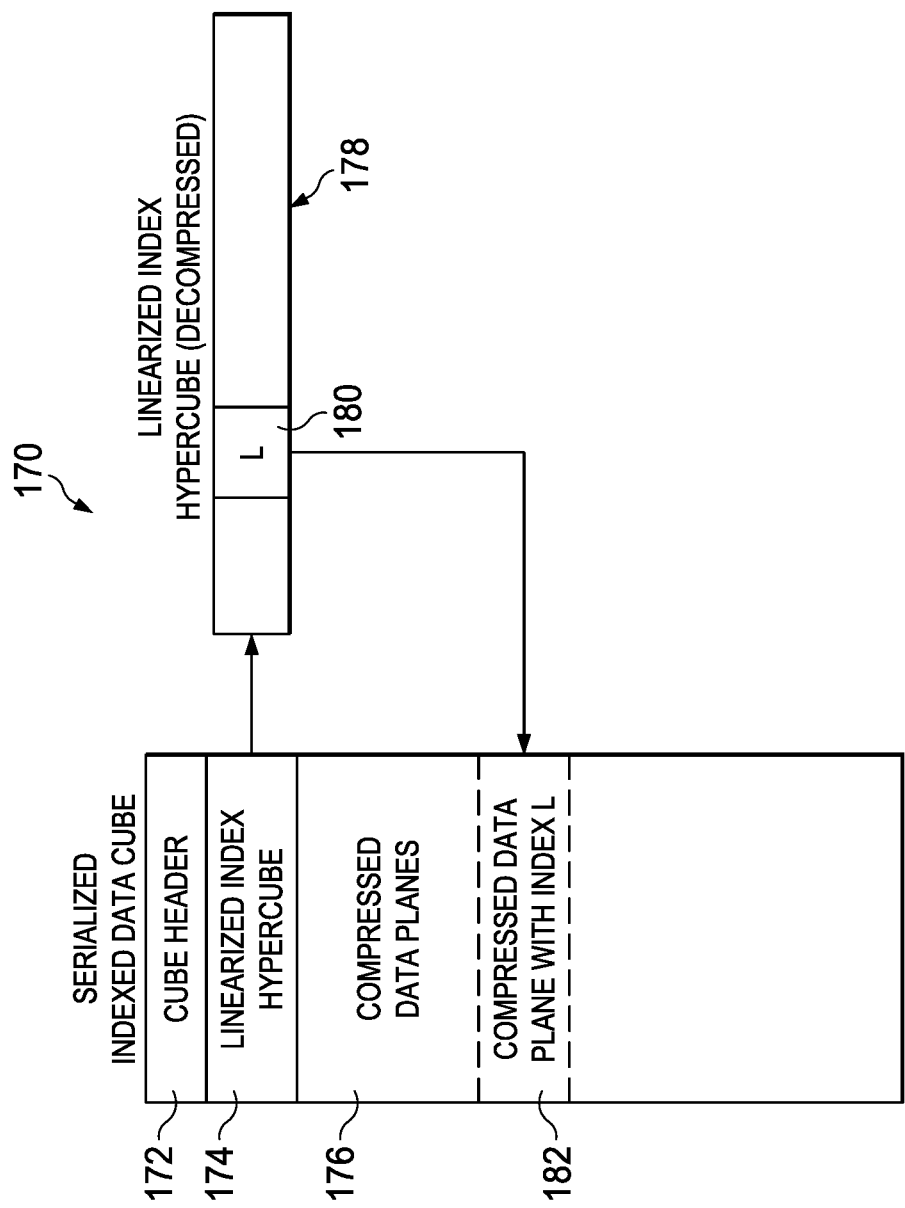
FIG. 6 is a simplified schematic block diagram illustrating a serialized indexed data cube (which represents the indexed data cube) that can be stored in the circular file.

Turning to FIG. 6, FIG. 6 is a simplified diagram illustrating an exemplary serialized indexed data cube 170, which can be generated by data management system 40 when indexed data cubes 110 are serialized for storing in circular file 100, according to various aspects of the present disclosure. In FIG. 6, serialized indexed data cube 170 represents an indexed data cube for a given time interval, such as indexed data cube 110B stored in time interval t2 of circular file 100. Serialized indexed data cube 170 includes a cube header 172, a linearized index hypercube 174 (corresponding with index hypercube 140), and compressed data cube 176 (corresponding with data cube 130) that includes a set of compressed data planes (for example, compressed data planes 135) associated with index hypercube 140. Cube header 172 includes metadata providing information about indexed data cube 110B. For example, cube header 172 can identify a format version of indexed data cube 110B, a schema version of indexed data cube 110B, a size (for example, in bytes) of indexed data cube 110B, an index hypercube pointer that points to a start of linearized index hypercube 174, various statistics associated with indexed data cube 110B (such as a number of data records and/or a number of data planes 135 contained in indexed data cube 110B), and/or other information useful to data management system 40 in identifying and/or defining indexed data cube 110B. Linearized index hypercube 174 is a linearized, compressed index hypercube that includes a linearized index 178. Linearized index 178 is a linearization of index hypercube 140, whose index hypercube elements 145 are represented by index pointers 180, each of which maps to (corresponds with) a compressed data plane in compressed data cube 176. Each index pointer 180 can specify an offset position of its corresponding compressed data plane in compressed data cube 176, along with a size of data records (for example, in bytes) in its corresponding compressed data plane. Each index pointer 180 essentially represents one of index hypercube elements 145 in index hypercube 140, which represents a unique combination of hashed values that match a combination of hashed index key values of one of the compressed data planes in data cube 130. For example, in FIG. 6, index pointer 180 designated as index L maps to a compressed data plane 182 corresponding with index L in compressed data cube 176, and index L and data records in compressed data plane 182 have matching combinations of hashed index key values. Linearized index hypercube 174 can further define index keys for data cube 130 and/or a number of dimensions of index hypercube 140.

Data management system 40 can substantially reduce query time by compressing and serializing indexed data cubes 110 into circular files, such as serialized indexed data cube 170. In some implementations, data management system 40 can organize data records per time interval in circular file 100 without generating indexed data cubes 110, instead storing data records (typically unsorted and uncompressed) per time interval without indexing the data records. In such implementations, circular file 100 can include a time index that points to each time interval in circular file 100, where data management system 40 can use the time index to locate unsorted data records for a particular time interval in response to a data query requesting data records for the particular time interval. Data management system 40 can then scan through one data record after another in the particular time interval to identify relevant data records, resulting in data queries taking far longer to resolve than desirable, particularly as an amount of data managed by data management system 40 reaches big data levels. In contrast, when data management system 40 is configured as FCDB, since data management system 40 organizes data records in indexed data cubes 110 (stored as serialized indexed data cubes 170) in circular file 100, data management system 40 can locate an indexed data cube for a particular time interval using time index 120 (such as indexed data cube 110B for time interval t2), and then use an index hypercube stored in the indexed data cube (such as index hypercube 140) to locate relevant data records within the particular time interval in a data cube stored in the indexed data cube (such as data cube 130).

In various implementations of data management system 40, database 50 represents on-disk data storage, in which data records are stored in specialized data structures (indexed data cubes 110) in circular files 100 on storage media (for example, hard disks, optical storage, solid state storage, or the like). Data manager 45 moves (writes) data from memory 62 (which can be referred to as main memory) to database 50 (which can be referred to as secondary memory). For example, when data manager 45 generates indexed data cube 110B (to include data cube 130 and index hypercube 140), data manager 45 can serialize indexed data cube 110B and write serialized indexed data cube 170 to circular file 100, particularly time interval t2 of circular file 110, in database 50. Data manger 45 can then move (read) data from database 50 to memory 62 as needed to respond to queries and/or perform other database operations. For example, when data manager 45 identifies indexed data cube 110B (stored as serialized indexed data cube 170) using time index 120, data manager 45 can move (read or extract) and decompress linearized index hypercube 178 from circular file 100 in database 50 to memory 62, and then use decompress linearized index hypercube 178 to locate and extract compressed data planes 176 mapping to particular pointers 180 (such as compressed data plane 182 mapped to index L). Data manager 45 can then decompress the identified data planes (such as compressed data plane 182) to scan for data records relevant to a query.

Figure 7:
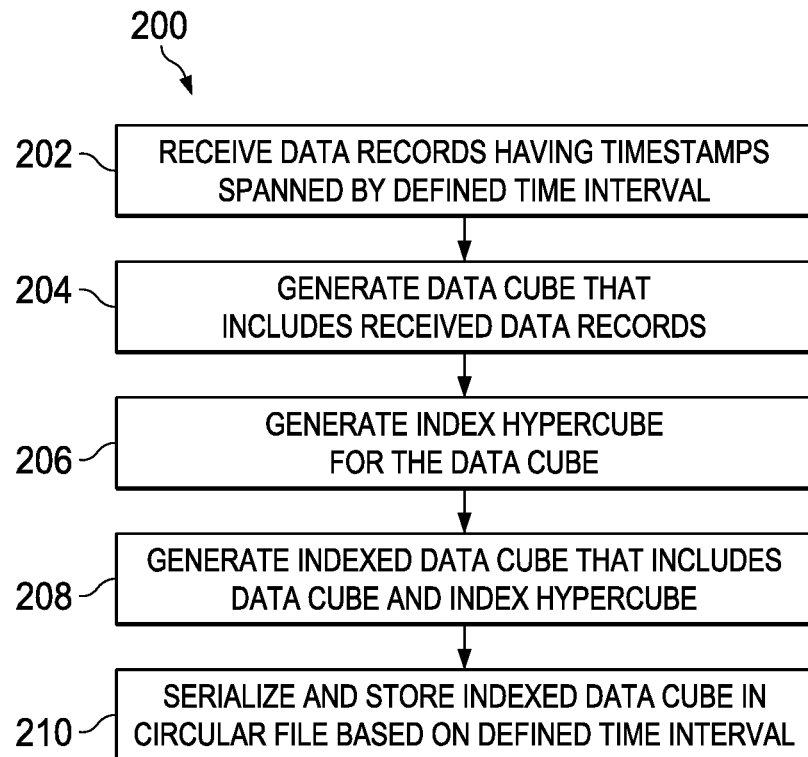
FIG. 7 is a simplified flow diagram illustrating example operations that can be associated with the data management system.

Turning to FIG. 7, FIG. 7 is a simplified flow diagram illustrating example operations 200 associated with various embodiments of communication system 10. Data management system 40 can perform operations 200 to transform data records into an indexed data cube for storing in database 50, such as indexed data cube 110B stored in time interval t2 in circular file 100 in database 50. At block 202, data records are received having timestamps spanned by a defined time interval. For example, data manager 45 receives data records having timestamps spanned by time interval t2. In some implementations, data collector 70 gathers and organizes the data records for data manager 45. In some implementations, data manager 45 receives the data records from data collectors distributed in communication system 10. At block 204, a data cube is generated that includes the received data records. For example, data manager 45 generates data cube 130 from the data records having timestamps spanned by time interval t2, where data manager 45 organizes the data records into data planes 135. In some implementations, data manager 45 can serialize, compress (using any suitable compression technique, such as LZ4 compression), and write each data plane 135 of data cube 130 to memory 62 for temporary storage. At block 206, an index hypercube is generated for the data cube. For example, data manager 45 builds index hypercube 140 from hashed index key values associated with data records contained in data cube 130. Data manager 45 can build index hypercube 140 using any suitable algorithm, in some implementations, in linear time. In some implementations, data manager 45 can serialize, compress (using any suitable compression technique, such as LZ4 compression), and write index hypercube 140 to memory 62 for temporary storage. For example, data manager 45 can build a serialized, compressed index hypercube (such as serialized index hypercube 174).

At block 208, an indexed data cube is generated that includes the data cube and the index hypercube. For example, data manager 45 generates indexed data cube 110B that stores data cube 130 with index hypercube 140. At block 210, the indexed data cube is serialized, compressed, and stored in a circular file. Serializing (also referred to as linearizing) generally refers to converting a data structure (such as indexed data cube 110B) into a string of bytes (or words) that data manger 45 can write to a file in a database (such as database 50). For example, data manager 45 can generate a serialized indexed data cube (such as serialized indexed data cube 170) for the indexed data cube (such as indexed data cube 110B) that can be stored in circular file 100, where the serialized indexed data cube includes a cube header (such as cube header 172), a serialized, compressed index hypercube (such as linearized index hypercube 174), and a data cube including compressed data planes (such as compressed data cube 176). Data manager 45 can update the serialized index hypercube to include an offset position of each compressed data plane in the circular file and/or a size of data records per index hypercube element 145 (in other words, a unique combination of hashed index key values). The serialized index data cube is stored in the circular file (such as circular file 100) based on the defined time interval. For example, since indexed data cube 110B contains data records having timestamps spanned by time interval t2, data manager 45 stores indexed data cube 110B in time interval t2 in circular file 100.

Figure 8:
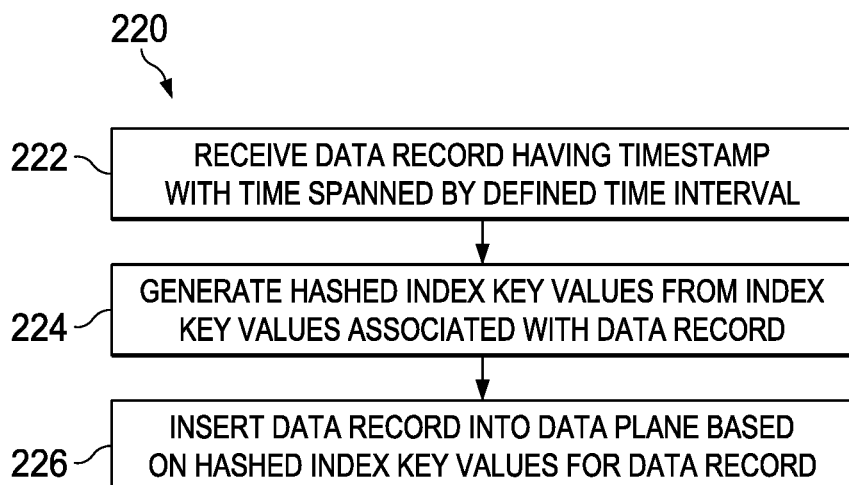
FIG. 8 is a simplified flow diagram illustrating example operations that can be associated with the data management system.

Turning to FIG. 8, FIG. 8 is a simplified flow diagram illustrating example operations 220 associated with various embodiments of communication system 10. Data management system 40 can perform operations 220 to generate a data cube, such as data cube 130. Data manager 45 can receive data records to be added to database 50 in chronological order, individually or in batches. At block 222, a data record is received having a timestamp spanned by a defined time interval. For example, when gathering data for time interval t2, data manager 45 receives a data record timestamped with a time spanned by time interval t2. At block 224, hashed index key values are generated from index key values associated with the data record. For example, data manager 45 applies any suitable hashing algorithm to index key values associated with the data record to generate hashed index key values. At block 226, the data record is inserted into a data plane of a data cube based on the hashed index key values for the data record. For example, data manager 45 inserts (organizes) the data record into one of data planes 135 based on the hashed index key values for the data record. In some implementations, operations associated with block 222, block 224, and block 226 are performed for each data record timestamped with a time spanned by the defined time interval, such as time interval t2, to generate a data cube containing data records associated with the defined time interval. At the end of time interval t2, data manager 45 can generate data cube 130 containing data records timestamped with times spanned by time interval t2, and then generate index hypercube 140 based on hashed index key values associated with data records contained in data cube 130. In various implementations, as data manager 45 receives data records, data manager 45 does not group the data records by index in memory 62. Instead, data manager 45 resolves the index to a linked list of pointers, where each pointer represents a unique combination of hashed index key values, and each new data record is added to the linked list based on its corresponding hashed index key values. For example, when data manager 45 receives a new data record, data manager 45 computes hashed index key values for the new data record and then updates a pointer in the linked list to correspond with the new data record, where the pointer has a unique combination of hashed index key values matching the hashed index key values for the new data record. Such configuration allows data manager 45 to insert data records in random order as received. Then, when writing the data records to database 50 (for example, when writing an indexed data cube to circular file 100), data manager 45 can reorder the data records in a data cube so that the combinations of hashed index key values are contiguous. In some implementations, data manager 45 can serialize, compress, and write data cube 130 and index hypercube 140 into indexed data cube 110B (which may be stored as serialized indexed data cube 170). For indexed data cube 110B, data manager 45 can write cube header 172 (which includes metadata that data manager 45 (in some implementations, data query engine 72) can use when accessing indexed data cube 110B in database 50), linearized index hypercube 174, and compressed data cube 176 (containing compressed data planes) to time interval t2 in circular file 100 in database 50. Linearized index hypercube 174 can store an offset position of each compressed data plane within data cube 176.

Figure 9:
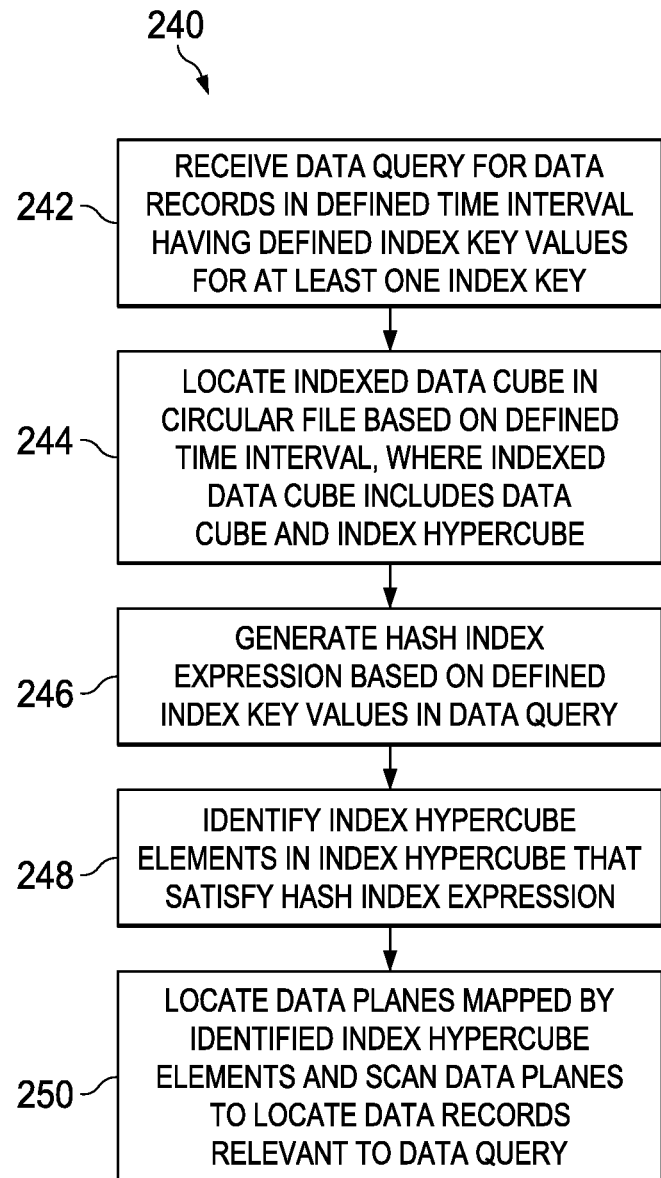
FIG. 9 is a simplified flow diagram illustrating example operations that can be associated with the data management system.

Turning to FIG. 9, FIG. 9 is a simplified flow diagram illustrating example operations 240 associated with various embodiments of communication system 10. Data management system 40 can perform operations 240 to extract data records from an indexed data cube in database 50, such as indexed data cube 110B stored in time interval t2 in circular file 100 in database 50. At block 242, a data query is received for data records in a defined time interval. The data query defines (specifies) index key values for at least one index key defined for searching data records. For example, data manger 45 receives a data query, such as data query 150, for data records in time interval t2. Data query 150 specifies index key values for a data source, an interface, and an application, as described above. At block 244, an indexed data cube is located in a database based on the defined time interval, where the indexed data cube includes a data cube and an index hypercube. For example, data manager 45 uses time index 120 to locate indexed data cube 110B, represented as serialized indexed data cube 170, in database 50 having data records timestamped with times spanned by time interval t2, where indexed data cube 110B includes data cube 130 and index hypercube 140. Data manger 45 can read cube header 172 to gather information about indexed data cube 110B, particularly to locate index hypercube 140. For example, data manager 45 locates linearized index hypercube 174 in serialized indexed data cube 170 and reads linearized index hypercube index 174. In some implementations, data manager 45 reads (moves or transfers) linearized index hypercube index 174 from database 50 into memory 62. In some implementations, data manager 45 decompresses linearized index hypercube index 174. At block 246, a hash index expression is generated based on the defined index key values. For example, data manager 45 can convert data query 150 (such as a SQL query) into hash index expression 160 (in other words, a logical expression of index keys and/or hashed index key values) using the index key values specified for the data source, the interface, and the application, as described above. The hash index expression, such as hash index expression 160, is used to identify data planes in the data cube (such as data planes 135 in data cube 130) for parsing to respond to the data query.

At block 248, an index hypercube element in the index hypercube is identified using the hash index expression. For example, data manager 45 uses hash index expression 160 to identify index hypercube elements 145 in hypercube 140. In some implementations, hash index expression 160 represents combinations of hashed values of index key values that satisfy the data query, and data manager 45 identifies at least one index hypercube element 145 having a combination of hashed values matching hash index expression 160, as described above. In some implementations, data manager 45 uses the identified index hypercube elements 145 to identify index pointers 180 in linearized index hypercube 174. At block 250, a data plane is located that maps to the index hypercube element, and the data plane is scanned to retrieve data records relevant to the data query. For example, data manager 45 identifies data planes 135 in data cube 130 that map to the identified index hypercube elements 145 and parses the identified data planes 135 for data records relevant to the data query. In some implementations, data manager 45 locates data planes using index pointers 180. For example, data manger 45 identifies compressed data planes in compressed data cube 176 mapped to the identified index pointers 180 in linearized index hypercube 174. In some implementations, data manager 45 reads (moves or transfers) the identified compressed data planes in data cube 176 from database 50 into memory 62. In some implementations, data manager 45 decompresses the identified compressed data planes and scans (in some implementations, by data query engine 72) the decompressed data planes for data records relevant to the data query. Accordingly, instead of reading and scanning an entire data set for a time interval, data management system 40 can read and parse a subset of data from the time interval (such as data records associated with particular index key values defined in the data query), significantly improving data queries.

As described herein, FCDB technology facilitates significantly faster data query response times by data management systems, such as data management system 40. When implementing FCDB technology, data management systems can execute data queries involving a large number of data records with minimal disk seeks and I/O operations compared to traditional database technologies (such as relational databases, columnar databases, specialized time series databases, and/or distributed file system databases). Further, since FCDB uses specialized data structures disclosed herein (indexed data cubes 110) to identify relevant data records, FCDB extracts (loads) less data from on-disk storage, resulting in minimal disk seeks and I/O operations without sacrificing data analytical and data query flexibility. Furthermore, using indexed data cubes 110, FCDB can scale linearly, achieving optimized data query performance without degrading even as data amounts and/or data sizes scale ever larger and on-disk storage is fragmented. Though data management system 40 is described with references to network traffic monitoring applications, the present contemplates data management system 40 and its associated operations described herein as readily applicable to any data management and/or data analysis applications. Also, though data management system 40 is described with references to time series data, data management system 40 and its associated operations described herein are readily applicable to non-time series data (such as L4 conversation data in communication system 10).

Although the FIGURES depict data management system 40 including data manager 45 and database 50, the present disclosure contemplates implementations where data manager 45 and database 50 are separate from data manager 45 and/or data management system 40. In some implementations, data manager 45 and/or database 50 may be distributed in communication system 10. Furthermore, in various implementations, FCDB is implemented over a distributed file system, such as Apache's Hadoop distributed file system (HDFS). In some implementations, data, such as indexed data cubes 110, can be stored in multiple nodes (data collectors) in communication system 10. In such implementations, data management system 40 is configured with MapReduce interface(s) that can distribute data queries (such as SQL queries) to nodes (data collectors) in communication system 10 for concurrent execution. Nodes (data collectors) can then provide query results to data management system 40, which combines the query results into a data query response. The present disclosure contemplates various other modifications and/or configurations to data management system 40 to optimize queries in a distributed file system, such as HDFS.

In example implementations, at least some portions of the activities outlined herein may be implemented in software in, for example, data management system 40 and/or data manager 45. In some embodiments, one or more of these features may be implemented in hardware, provided external to these elements, or consolidated in any appropriate manner to achieve the intended functionality. Various network elements described herein (for example, end point devices, routers 30a-30h, switches 32a-32b, data management system 40, and/or data manager 45) may include software (or reciprocating software) that can coordinate in order to achieve the data management operations as outlined herein. In still other embodiments, these elements may include any suitable algorithms, hardware, software, components, modules, interfaces, or objects that facilitate the operations thereof. Furthermore, end point devices, routers 30a-30h, switches 32a-32b, data management system 40, and/or data manager 45 described and shown herein (and/or associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (for example, memory 62, database 50, and circular files 100) can store data used for the operations described herein. This includes the memory element being able to store instructions (e.g., software, logic, code, etc.) in non-transitory media, such that the instructions are executed to carry out the activities described in this Specification. A processor (for example, processor 60) can execute any type of instructions associated with the data to achieve the operations detailed herein in this Specification. In one example, a processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In another example, the activities outlined herein may be provided in any suitable type of non-transitory, tangible storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described herein should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of the communication system 10 as described herein. Note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations", "some implementations", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method for managing data, the method comprising:
    receiving data records timestamped with times spanned by a defined time interval;

generating, from the received data records, a data cube that includes data planes, wherein each data plane contains a set of data records timestamped with times spanned by the defined time interval;

in response to generating the data cube, generating an index hypercube for the data cube, wherein dimensions of the index hypercube represent hash values of index keys defined for accessing the data cube; and in response to generating the index hypercube, generating an indexed data cube for storing in a database, wherein the indexed data cube includes the data cube and the index hypercube.

2. The method of claim 1, further comprising storing the indexed data cube in a circular file of the database based on the defined time interval.

3. The method of claim 1, wherein the index hypercube includes index hypercube elements, wherein each index hypercube element represents a unique combination of hashed index key values.

4. The method of claim 3, wherein each index hypercube element maps to a data plane of the data cube, wherein the data plane includes data records having a combination of hashed index key values that matches the combination of hashed index key values represented by the index hypercube element.

5. The method of claim 1, wherein generating the data cube includes:
   receiving a data record timestamped with a time spanned by the defined time interval;
   generating hashed index key values from index key values associated with the data record; and
   inserting the data record into a data plane of the data cube based on the hashed index key values for the data record.

6. The method of claim 1, wherein the indexed data cube is stored in the database based on time, the method further comprising:
   receiving a query for data records in the defined time interval; and
   using a time index to locate the indexed data cube in the database based on the defined time interval.

7. The method of claim 1, wherein the indexed data cube is stored in the database, the method further comprising:
   receiving a data query for data records having defined index key values for at least one index key;
   generating a hash index expression based on the defined index key values for the at least one index key; and
   identifying an index hypercube element that satisfies the hash index expression; and
   locating a data plane in the data cube mapped by the identified index hypercube element.

8. A non-transitory computer readable medium storing instructions, which when executed by at least one processor, causes the at least one processor to:
   receive data records timestamped with times spanned by a defined time interval;
   generate, from the received data records, a data cube that includes data planes, wherein each data plane contains a set of data records timestamped with times spanned by the defined time interval;
   in response to the generation of the data cube, generate an index hypercube for the data cube, wherein dimensions of the index hypercube represent hash values of index keys defined for accessing the data cube; and
   in response to the generation of the index hypercube, generate an indexed data cube for storing in a database, wherein the indexed data cube includes the data cube and the index hypercube.

9. The non-transitory computer readable media of claim 8, further comprising instructions, which when executed by at least one processor, causes the at least one processor to store the indexed data cube in a circular file of the database based on the defined time interval.

10. The non-transitory computer readable media of claim 8, wherein the index hypercube includes index hypercube elements, wherein each index hypercube element represents a unique combination of hashed index key values.

11. The non-transitory computer readable media of claim 10, wherein each index hypercube element maps to a data plane of the data cube, wherein the data plane includes data records having a combination of hashed index key values that matches the combination of hashed index key values represented by the index hypercube element.

12. The non-transitory computer readable media of claim 8, further comprising instructions, which when executed by at least one processor, causes the at least one processor to:
   receive a data record timestamped with a time spanned by the defined time interval;
   generate hashed index key values from index key values associated with the data record; and
   insert the data record into a data plane of the data cube based on the hashed index key values for the data record.

13. The non-transitory computer readable media of claim 8, further comprising instructions, which when executed by at least one processor, causes the at least one processor to:
   receive a query for data records in the defined time interval; and
   use a time index to locate the indexed data cube in the database based on the defined time interval.

14. The non-transitory computer readable media of claim 8, further comprising instructions, which when executed by at least one processor, causes the at least one processor to:
   receive a data query for data records having defined index key values for at least one index key;
   generate a hash index expression based on the defined index key values for the at least one index key; and
   identify an index hypercube element that satisfies the hash index expression; and
   locate a data plane in the data cube mapped by the identified index hypercube element.

15. A data management system comprising:
   at least one processor; and
   a memory storing instructions, which when executed by the at least one processor, causes the at least one processor to
      receive data records timestamped with times spanned by a defined time interval;
      generate, from the received data records, a data cube that includes data planes, wherein each data plane contains a set of data records timestamped with times spanned by the defined time interval;
      in response to the generation of the data cube, generate an index hypercube for the data cube, wherein dimensions of the index hypercube represent hash values of index keys defined for accessing the data cube; and
      in response to the generation of the index hypercube, generate an indexed data cube for storing in a database, wherein the indexed data cube includes the data cube and the index hypercube.

16. The data management system of claim 15, further comprising instructions, which when executed by at least one processor, causes the at least one processor to store the indexed data cube in a circular file of the database based on the defined time interval.

17. The data management system of claim 15, wherein the index hypercube includes index hypercube elements, wherein each index hypercube element represents a unique combination of hashed index key values.

18. The data management system of claim 17, wherein each index hypercube element maps to a data plane of the data cube, wherein the data plane includes data records having a combination of hashed index key values that matches the combination of hashed index key values represented by the index hypercube element.

19. The data management system of claim 15, further comprising instructions, which when executed by at least one processor, causes the at least one processor to:
   receive a data record timestamped with a time spanned by the defined time interval;
   generate hashed index key values from index key values associated with the data record; and
   insert the data record into a data plane of the data cube based on the hashed index key values for the data record.

20. The data management system of claim 15, further comprising instructions, which when executed by at least one processor, causes the at least one processor to:
   receive a query for data records in the defined time interval; and
   use a time index to locate the indexed data cube in the database based on the defined time interval.

* * * * *